J. BOWEN.
BUNG CUTTER.
No. 182,744. Patented Oct. 3, 1876.
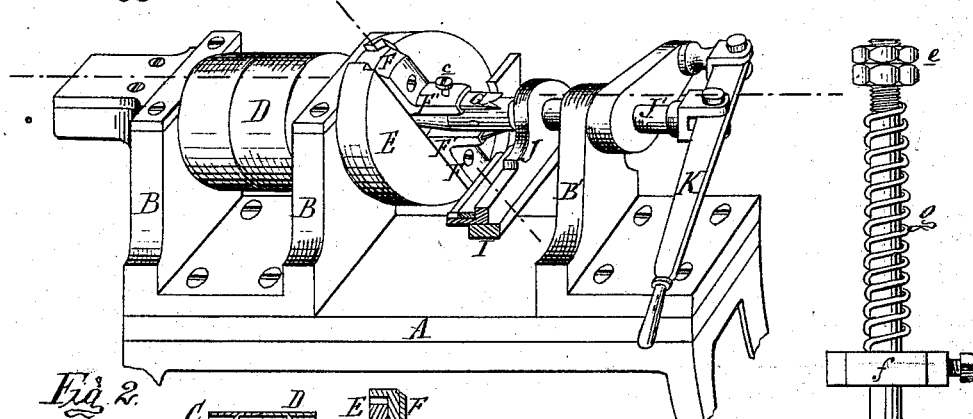
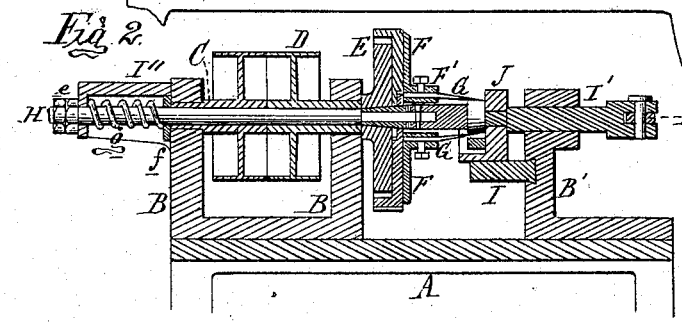
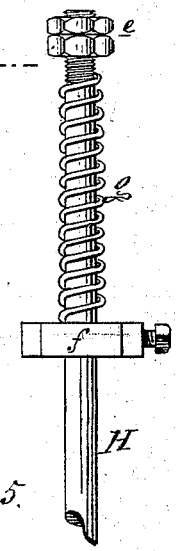
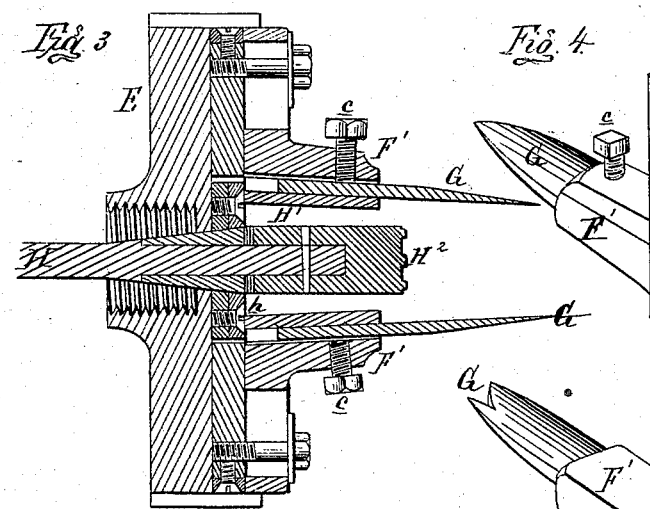
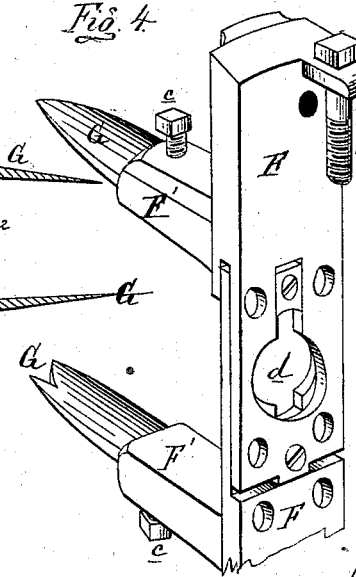
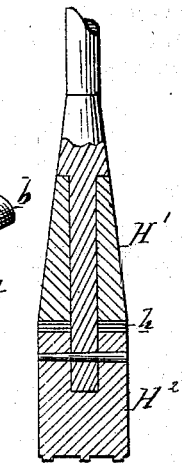

UNITED STATES PATENT OFFICE.

JOHN BOWEN, OF DETROIT, MICHIGAN.

IMPROVEMENT IN BUNG-CUTTERS.

Specification forming part of Letters Patent No. 182,744, dated October 3, 1876; application filed June 6, 1876.

*To all whom it may concern:*

Be it known that I, JOHN BOWEN, of Detroit, in the county of Wayne and State of Michigan, have invented an Improvement in Machine for Cutting Bungs, of which the following is a specification:

The object I have in view is the construction of a lathe for cutting tapered bungs, in such a manner that the tools or knives will commence cutting the base or widest part of the bung first, and complete the cutting through a strip of wood, completing the cutting operation at the apex of the bung; and it consists in the combination, with the face-plate or chuck, of the peculiar sliding tool-carriers, and the sliding cone for moving the said tool-carriers; and, further, in the combination, construction, and arrangement of the various operative parts, all as more fully hereinafter explained.

Figure 1 is a perspective view. Fig. 2 is a central longitudinal vertical section. Fig. 3 is an enlarged vertical section through the face-plate, tool-carriers, cutters, and tapered rest. Fig. 4 is an enlarged perspective view of the tool carriers and cutters detached from the face-plate or chuck. Fig. 5 is a sectional elevation of the spindle-rest and its conical head.

In the drawing, A represents the frame of the machine, having a double head-stock, B, at one end, and a tail-stock, B', at the other. C is a live-spindle, hollow throughout its entire length, journaled in the head-stock, and driven by a belt passing around its fast pulley D. E is a face-plate or chuck, fastened on the inner end of the spindle C, and has a dovetail-groove cut clear across its face, which groove has inserted in it, from opposite sides, the bases of two tool-carriers, F F, Fig. 4, whose shanks overlap each other, as shown, and are free to play or slide, one upon the other, to a certain extent. They are prevented from passing endwise out of the groove by a set-screw, $a$, passing through a lug, $b$, projecting back from the outer end of each, which screw is tapped into the periphery of the chuck. The carriers have each a shank, F', projecting from the heel nearly at a right angle therewith, with a socket in the end to receive an inclined knife, G, which is secured therein by a set-screw, $c$. The cutting-edges of the knives are inclined to the same taper or bevel that it is desired to cut the bung. A circular opening, $d$, is cut through the overlapping plates of the tool-carriers in the axis of the spindle, when the cutters are drawn together, as when a bung is completed.

The centrifugal force developed in the rotation of the chuck will throw outwardly these tool-carriers as far as their respective screws $a$ will permit, when the openings $d$ $d$ will not coincide. These set-screws $a$ $a$ are not absolutely essential to the holding of the tool-carriers in the groove; but are used for preventing the bases of the openings $d$ from revolving in contact with the rest-stem, and heating, which rest-stem would prevent them from sliding out of the groove.

H is a spindle or stem lying in and extending through the live-spindle C, and also through a box, I'', on the back end of the head-stock, where it receives two jam-nuts, $e$, Fig. 2. $f$ is a collar keyed or secured by a set-screw on the stem H in the box, next to the head-stock, and between it and the back end of the box a spring, $g$, is spirally coiled on the stem, which shoots forward the said stem as far as the collar will allow, while allowing it to be pressed back from the chuck. The stem, where it passes through the chuck, is reduced in diameter, and on it is sleeved a cone, H$^1$, beyond which a spur-head, H$^2$, is keyed on the extremity of said stem. Between the head H$^2$ and the base of the cone several washers, $h$, Fig. 5, are interposed, to take up the friction, as the cone, when wedged into the openings of the tool-carriers, rotates with them, while the head and stem remain, or are held stationary by the collar $f$ in the box. I is a bracket-shelf on the face of the tail-stock, on which is laid a flanged rest, J, on which the strip from which the bungs are to be cut is laid edge up. This rest is moved toward or away from the cutters by a rod, J', projecting through the head of the tail-stock, and engaging with a hand-lever, K, by means of which said rest is moved to and fro, as set forth.

The chuck being rotated at a high rate of speed, the centrifugal force developed will cause the tool-carriers to recede from each other. If a strip of wood be laid edgewise on the rest, and the latter be moved toward the chuck, the ends of the cutters will commence cutting a circle into the face of the strip the diameter of the base of the bung. As the strip is fed up, the cone $H^1$ enters the openings in the tool-carriers, and gradually draws them together, so that by the time the cutters have pierced the strip, they will have been drawn together, and their angularity with relation to the axis of the chuck will give the bung the same taper. The bung is held fast by the spurs on the end of the head $H^2$, and pushes in the stem and cone as the cutting proceeds.

The bevel of the bung may be altered by changing the angle of the cutters, by means of shims or wedges under their shanks.

The diameter of the bung to be cut may be changed by changing the pitch of the cone, by substituting another of the required shape, and readjusting the movement of the tool-carriers thereto.

What I claim as my invention is—

1. The combination, with the face-plate E, having a dovetail groove cut across its face, of the tool-carriers F F', sliding in the said groove, and the sliding cone $H^1$, substantially as described and shown.

2. The combination, with the face-plate E, having a dovetail groove cut across its face, of the tool-carriers F F', sliding in the said groove, and having their shanks overlap, the opening $d$, set-screws $a\ a$, and sliding cone $H^1$, substantially as described and shown.

3. The combination, with the face-plate E, and sliding tool-carriers, of the sliding spindle H, the cone $H^1$, sleeved loosely thereon, the head $H^2$ fixed to the said spindle, and the washers $h$, constructed and arranged substantially as described and shown.

JOHN BOWEN.

Witnesses:
  H. F. EBERTS,
  H. S. SPRAGUE.